United States Patent Office 3,310,506
Patented Mar. 21, 1967

3,310,506
CELLULAR POLYIMIDE PRODUCT
Leonard Edward Amborski and William Paul Weisenberger, Buffalo, N.Y., assignors to E. I. du Pont de Nemours and Company, Wilmington, Del., a corporation of Delaware
No Drawing. Filed Mar. 18, 1963, Ser. No. 266,066
18 Claims. (Cl. 260—2.5)

This invention relates to cellular structures of polyimides and a process for making them.

In the prior art, resinous compositions have been made into foams by physically mixing the molten or plasticized resin with gases or blowing agents. However, obtaining polyimide resins in the molten state is not easily possible since the resins are resistant to heat and tend to degrade before or during melting. Using a plasticizer is also difficult since the resins are quite resistant to most chemicals. In other words, the same outstanding physical and chemical properties that would make these foamed polymers extremely useful in the form of shaped cellular articles make it extremely difficult to obtain these articles in the first instance.

An object of the present invention is to form foamed polyimides and articles thereof. Other objects will appear hereinafter.

The objects are accomplished by first forming a solution containing at least one-polyamide-acid having an inherent viscosity of at least 0.1, preferably 0.3–5.0; forming dispersed bubbles in the solution, e.g. by beating the solution until a froth forms; shaping the bubble-containing solution into a cellular polyamide-acid article; and thereafter, converting polyamide-acid to polyimide.

The process may be divided into four steps:

(1) Preparing the polyamide-acid solution.
(2) Introducing bubbles into the solution.
(3) Shaping the solution having bubbles dispersed therein into a useful structure.
(4) Converting polyamide-acid to polyimide.

Each of these steps will be discussed separately in subsequent portions of this specification.

PREPARING POLYAMIDE-ACID SOLUTIONS

The process for preparing the polyamide-acid involves reacting at least one organic diamine having the structural formula

wherein R' is a divalent radical containing at least 2 carbon atoms, the two amine groups of said diamine each attached to separate carbon atoms of said divalent radical; with at least one tetracarboxylic acid dianhydride having the structural formula

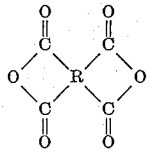

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature sufficient to provide a shapeable polymeric composition containing polyamide-acid.

It should be understood that it is not necessary that the polymeric component be composed entirely of the polyamide-acid. This is particularly true since conversion to the polyimide is contemplated subsequent to shaping. To retain its shapeability, it has been found that in most instances the polymeric component should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired and the minimum period of time that one desires for the reaction. For most combinations of diamines and dianhydrides falling with the definitions given above, it is possible to form polymeric components of 100% polyamide-acid by conducting the reaction below 100° C. However temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc., it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. For forming the shaped articles, it has been found that the most successful results are obtained when the solvent represents at least 60% of the final polymeric solution. That is, the solution should contain 0.05–40% of the polymeric component. The viscous solution of the polymeric composition containing polyamide-acid in the polymeric component dissolved in the solvent is the result of the first step.

The starting materials for forming the products of the present invention are organic diamines and tetracarboxylic acid dianhydrides. The organic diamines are characterized by the formula: $H_2N-R'-NH_2$, wherein R', the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred R' groups in the diamines are those containing at least 6 carbon atoms characterized by benzenoid unsaturation. Such R' groups include

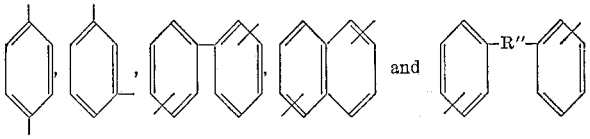

wherein R'' is selected from the group consisting of carbon in an alkylene chain having 1–3 carbon atoms, —O—, silicon in

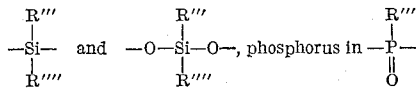

and

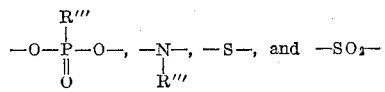

wherein R''' and R'''' are alkyl or aryl. Among the diamines which are suitable for use in the present invention are:

metaphenylene diamine;
para-phenylene diamine;
4,4'-diamino-diphenyl propane;
4,4'-diamino-diphenyl methane;
benzidine;
4,4'-diamino-diphenyl sulfide,
4,4'-diamino-diphenyl sulfone;
3,3'-diamino-diphenyl sulfone;
4,4'-diamino-diphenyl ether;
2,6-diamino-pyridine;
bis-(4-amino-phenyl) diethyl silane;
bis-(4-amino-phenyl) diphenyl silane;
bis-(4-amino-phenyl)-N-methylamine;
1,5-diamino naphthalene;
3,3'-dimethyl-4,4'-diamino-biphenyl;
3,3'-dimethoxy benzidine;
2,4-bis(beta-amino-t-butyl) toluene;
bis-(para-beta-amino-t-butyl-phenyl) ether;
para-bis (2-methyl-4-amino-pentyl) benzene;
para-bis-(1,1-dimethyl-5-amino-pentyl)benzene;
m-xylylene diamine;
p-xylylene diamine;
bis(para-amino-cyclohexyl) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy)ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;
3,3'-dichlorobenzidine;
bis-(4-amino-phenyl) ethyl phosphine oxide;
bis-(4-amino-phenyl) phenyl phosphine oxide;
bis-(4-amino-phenyl)-N-phenylamine; and
mixtures thereof.

The tetracarboxylic acid dianhydrides are characterized by the following formula:

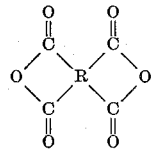

wherein R is a tetravalent organic radical selected from the group consisting of aromatic, aliphatic, cycloaliphatic, heterocyclic, combination of aromatic and aliphatic, and substituted groups thereof. However, the preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

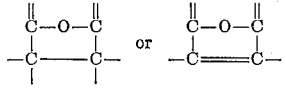

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
1,2,3,4-butane tetracarboxylic dianhydride;
thiophene-2,3,4,5-tetracarboxylic dianhydride;
3,4,3',4'-benzophenone tetracarboxylic dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the foamed polyamide-acid shaped articles by evaporation, displacement or diffusion. Other typical compounds of this useful class of solvents are: N,N-diethylformamide, N,N-diethylacetamide, N,N-dimethylmethoxy acetamide, N-methylcaprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methyl-formamide and butyrolactone. The solvents can be used alone, in combinations of solvents, or in combination with poor solvents such as benzene, benzonitrile, dioxane, xylene, toluene and cyclohexane.

INTRODUCING BUBBLES INTO THE SOLUTION

The gas bubbles can be supplied from a variety of sources, and somewhat different methods are needed to handle the various types. For instance, air bubbles can be beaten or agitated into the solution in a mechanical frothing process. Nitrogen bubbles can be supplied by adding to the solution the commercial blowing agents "Nitrosan" Blowing Agent, "Unicel" Blowing Agent, "Celogen AZ" and "Celogen" p,p-oxybis (benzene sulfonyl hydrazide) or azobis (isobutyronitrile) and then heating the solution to liberate the nitrogen gas. Fluoro and fluorochloro derivatives of lower hydrocarbons, such as the "Freon" Blowing Agents, produce bubbles at room temperature or slightly higher in a very convenient manner. "Freon–11" is a good selection if one wants to add a liquid at room temperature and obtain bubbles by only slight heating. Carbon dioxide bubbles can be supplied in the form of sodium bicarbonate or Dry Ice. Carbon dioxide bubbles can also be supplied by adding dihydroxymaleic acid, malonic acid, methyl malonic acid, pyruvic acid, and some beta-keto acids and then heating.

The general procedure for using gases as such (including the fluorinated hydrocarbon type of agent) is to disperse them in the polyamide-acid solution before converting to polyimide, even before introduction of chemical converting agent and amine catalyst where chemical conversion is used. After the converting chemicals have been stirred in, the foamed solution is agitated until it gels. This prevents partial foam collapse.

SHAPING THE COMPOSITION INTO A USEFUL STRUCTURE

The polyamide-acide composition containing the bubbles dispersed therein is next shaped into a useful article and then dried to a solid foam or cellular article containing pores by heating at about 300° C. for 0.5–3 hours depending upon the thickness of the article. Shaping may be accomplished by casting onto flat or curved surfaces to form sheets, films, etc., or by placing in molds of the desirable shape. The composition may also be coated on to substrates.

CONVERTING POLAMIDE-ACID TO POLYIMIDE

The shaped articles composed of a substantial amount of the polyamide-acid in the foamed article are converted to the respective polyimide shaped articles by any one or more of several processes. One process comprises converting the polyamide-acid units of the following structural formula:

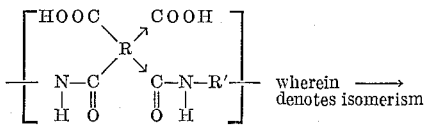

wherein ⟶ denotes isomerism to polyimide by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the polyimide structure are obtained as well as an increase in inherent viscosity.

A second process for converting polyamide-acid to the corresponding polyimide is a chemical treatment and involves treating the article of polyamide-acid with a dehydrating agent alone or in combination with a tertiary amine, e.g. acetic anhydride or an acetic anhydride-pyridine mixture. The foamed polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclyzing agent, the acetic anhydride.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids (ref. Bernthsen-Sudborough, textbook of Organic Chemistry, Van Nostrand, 1935, page 861 and Hackh's Chemical Dictionary, Blakiston, 1953, page 468), derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratric acid; trimethoxy benzoic acid; alpha- and beta-naphtholic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6- lutidine and 2,4,6-collidine, and are generally used in larger amounts. The amine functions as a catalyst for the action of the cyclyzing agent, the anhydride.

As a third process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step can be limited if it is desired to shape the composition at this stage. After shaping, the completion of the cyclization of the polyimide/polyamide-acid may be accomplished.

The presence of polyimide is evidenced by its insolubility in cold basic reagents as opposed to the rapid solubility of polyamide-acid. Its presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates.

By these methods foamed sheets from 5 mils to approximately 10 inches in thickness can be made readily. Densities of the foamed polyimides range from 0.01 g./cc. to 0.5 g./cc. Some are rigid and others are compressible, depending upon the thickness and the extent of foaming. Both open and closed cell foams can be made in this manner.

The products include low density, fireproof insulating structures of obvious utility for a variety of insulating and other protective purposes. These foamed products can be produced in the form of films, sheets, slabs, filaments, cylinders, etc. and in these forms can be laminated to other structures. The polyimides of the foam can contain electrically conductive particles, abrasive particles, pigments, etc. Carbon black, either electrically conductive or not, is a particularly useful additive.

Typical uses for the foamed products are cryogenic insulation, flameproofing (as in fire doors, fire fighting apparel and electric blankets), aircraft and missile insulation (ablation, radiation and heat shields), energy absorbers for use at extremes of temperature, microwave antenna enclosures, insulation for ovens and air conditioning equipment, gasketing, appliances requiring combined electrical insulation and flame-resistance, etc. In general, a wide variety of uses can be visualized because these foams provide a new degree of freedom in design wherever thermal stability, radiation-resistance and toughness are needed in addition to low density, resilience, flame and chemical resistance and electrical insulation.

The invention will be more clearly understood by referring to the examples which follow. These examples, which illustrate specific embodiments of the present invention, should not be construed to limit the invention in any way.

*Example 1*

A 12% by weight solution in N,N'-dimethylacetamide of the polyamide-acid of pyromellitic dianhydride and 4,4'-diamino-diphenyl ether prepared in accordance with the disclosures in applications Ser. No. 95,014 filed Mar. 13, 1961 and Ser. No. 169,120 filed Jan. 26, 1962 was agitated violently in air at room temperature until a considerable number of air bubbles had been whipped into the solution. Then 12 ml. of acetic anhydride and 2 ml. of pyridine were added to the mixture. Agitation was continued until the mixture had thickened considerably. This foamed gel was cast onto a hot glass plate which was resting on a steam bath. After a few minutes of heating on the steam bath, the plate was moved to an oven where the foamed sheet was dried at about 300° C. for about one hour. The resulting cellular polyimide sheet had a density of about 0.1 g./cc. and was strong and tough.

*Example 2*

Nitrogen gas was bubbled for 2 minutes through a ⅛ inch tube under a pressure of about 20 lbs. per inch into 100 g. of a 12% by weight solution in N,N'-dimethylacetamide of the polyamide-acid made from pyromellitic dianhydride and 4,4' - diamino - diphenyl ether. This foamed solution was then treated with the chemical converting agents, gelled and dried as described in Example 1. The resulting foamed sheet had similar properties to the product of Example 1.

*Example 3*

A similar polyimide foam was produced by introducing carbon dioxide gas in the form of Dry Ice. The latter was added to another portion of the solution of polyamide-acid described in the previous examples, and the solution was agitated while acetic anhydride and pyridine were added as above and while the solution was allowed to warm and to gel. During this time the carbon dioxide vaporized and caused foaming. The gelled foam was cast onto a glass plate as described in Example 1, heated on a steam bath and then in a 300° C. oven to complete the drying of the foamed polyimide product.

*Examples 4–8*

To 100 g. portions of the 12% polyamide-acid solution described in Example 1, each containing 12 ml. of acetic anhydride, one gram of each of the following blowing agents was added: Example 4—"Unicel" Blowing Agent (active ingredient: N,N' - dinitrosopentamethylenetetramine); Example 5—"Nitrosan" Blowing Agent (active ingredient: N,N'-dimethyl - N,N' - dinitrosoterephthalamide); Example 6—"Celogen" (active ingredient: azodicarbonamide); Example 7—"Celogen" [active ingredient: p,p-oxybis(benzene solfonyl hydrazide)]; Example 8—"Vazo" [active ingredient: $\alpha,\alpha'$-azobis (isobutryonitrile)]. Two ml. of pyridine was added to each mixture with agitation, which was continued until the mixture had gelled sufficiently to permit casting into a sheet. Each of these mixtures was cast, heated and dried as described in Example 1, thus producing a foamed sheet having about the same properties as those described in Example 1.

*Example 9*

The foamed, gelled solution of Example 1 is cast in a thin layer onto kraft paper and onto thin aluminum foil. Adhesion is good to both substrates, and toughness and thermal resistance are also improved in both cases over the corresponding properties of the uncoated substrates.

*Example 10*

To 70 g. of the clear, unfoamed polyamide-acid solution described in Example 1 is added 2 g. of acetylene black. Then the remainder of the Example 1 procedure is followed, producing an electrically conductive polyimide film. When the foamed, gelled polyamide-acid mixture is cast onto glass cloth before final heating, an electrically conductive, tough and flameproof coating is produced. These properties make the product well adapted to various electrical uses.

*Example 11*

A portion of the foamed gel of Example 1, containing both acetic anhydride and pyridine, is cast onto a copper foil. The composite is heated at about 300° C. until curing of the foam is complete. The foamed polyimide is adhered tightly to the substrate, and the laminate is suitable for the manufacture of light weight flexible printed circuits.

*Example 12*

Sheets of cellular polyimide as prepared in Example 1 are each coated with a layer of a commercial epoxy adhesive called DEN 438, to which has been added an anhydride curing agent as specified by the supplier. To each coated sheet one of the following films is applied, followed by heating to cure the adhesive between the two layers: polyethylene, polypropylene, polyvinyl fluoride, polyethylene terephthalate, the polyimide of pyromellitic dianhydride and bis(4-aminophenyl) ether, the copolymer of tetrafluoroethylene with hexafluoropropylene, the combination of the above polyimide coated with a thin layer of the tetrafluoroethylene/hexafluoropropylene copolymer and the combination of a copper foil coated with the same copolymer.

The polyethylene and polypropylene film laminates are very effective construction materials for use where advantage is taken of the combination of light weight and flame-resistance of the cellar polyimide with the low cost barrier properties of the polyolefin film. An even more versatile and more flame-resistant laminate may be made by bonding a layer of polyolefin film between two layers of cellular polyimide.

The laminate with polyvinyl fluoride is an unusually good material for fire-wall construction. The last five laminates are designed for electrical applications. A superior product for some purposes such as heating elements results from use of a film having an electrically conductive layer of aluminum on its surface, or of a film made from polymer filled with electrically conductive carbon black.

Example 13

Cellular polyimide laminates to fiber glass, to nonwoven fabrics of an aromatic polyamide, polyethylene, polypropylene and polyethylene terephthalate are prepared by coating a cellular polyimide as prepared in Example 1 with an epoxy resin as described in Example 12, combining with the fibrous material, and heating under pressure to cure the adhesive. Similar products also result from coating the same substrates with the foamed gel of Example 1 (containing both acetic anhydride and pyridine), followed by moderate heating until conversion to polyimide is complete. These laminates are suitable for making fire-resistant thermal insulation.

Example 14

The laminate of a polyimide film to a polyimide foam having excellent bond strength is prepared by coating a slab of the foam of Example 1 with a layer of the polyamide-acid solution of Example 1 followed by heating at 300–400° C. for about one hour.

Example 15

Laminates of polyimide foam to foams of rubber, polyurethane and polytetrafluoroethylene/hexafluoropropylene are prepared by the laminating procedure of Example 13. These products provide good flexible upholstery of reduced flammability for use in furniture.

Example 16

Wires of copper, aluminum and stainless steel are coated with the cellular polyimide of Example 1 by extruding over each one the partially gelled solution of Example 4 followed by heating at 300–400° C. Similar products also result from wrapping these same wires with strips of cellular polyimide film, and bonding the ends of the strips with the epoxy resin described in Example 12.

Examples 17–18

In Example 17, light weight fabrics suitable for making flame-proof protective clothing result from laminating thin sheets of the cellular polyimide of Example 4 to leather and to cotton cloth, using the epoxy adhesive described in Example 12.

In Example 18, a similar but even more flame-proof fabric-like material is made by coating asbestos cloth with the foamed gel of Example 1 followed by heating at 300–400° C. to cure the foam to a tightly adhering layer of the cellular polyimide.

Example 19

Panels of wood and of fibrous polyethylene terephthalate are made flame-proof by coating them with layers of the foamed gel of Example 1 containing the acetic anhydride and pyridine and heating the coated structure to complete the conversion to polyimide.

Having fully disclosed the invention, what is claimed is:

1. A process which comprises mixing at least one diamine with at least one tetracarboxylic acid dianhydride having the structural formula

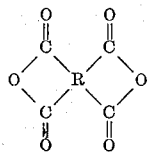

wherein R is a tetravalent radical containing at least 2 carbon atoms, no more than 2 carbonyl groups of said dianhydride attached to any one carbon atom of said tetravalent radical, in a solvent for at least one of said diamine and said dianhydride under conditions to form a solution containing at least one polyamide-acid; introducing bubbles into said solution to form a shapeable polymeric composition having said bubbles dispersed uniformly therein; shaping said composition into a shaped cellular article; and heating said composition above 50° C. for a time sufficient to form polyimide from said polyamide-acid.

2. A process as in claim 1 wherein said diamine is 4,4'-diamino-diphenyl ether.

3. A process as in claim 1 wherein said dianhydride is pyromellitic dianhydride.

4. A process as in claim 1 wherein said solvent is dimethylacetamide.

5. A process which comprises mixing at least one diamine with at least one tetracarboxylic acid dianhydride having the structural formula

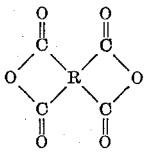

wherein R is a tetravalent radical containing at least 2 carbon atoms, no more than 2 carbonyl groups of said dianhydride attached to any one carbon atom of said tetravalent radical, in a solvent for at least one of said diamine and said dianhydride under conditions to form a solution containing at least one polyamide-acid; introducing bubbles into said solution to form a shapeable polymeric composition having bubbles dispersed uniformly therein; shaping said composition into a shaped cellular article; and treating said composition with an anhydride selected from the group consisting of lower fatty acid anhydrides and aromatic monobasic acid anhydrides to convert the polymer in said article to polyimide.

6. A process which comprises mixing at least one diamine with at least one tetracarboxylic acid dianhydride having the structural formuula

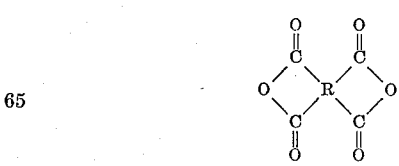

wherein R is a tetravalent radical containing at least 2 carbon atoms, no more than 2 carbonyl groups of said dianhydride attached to any one carbon atom of said tetravalent radical, in a solvent for at least one of said diamine and said dianhydride under conditions to form a solution containing at least one polyamide-acid; introducing bubbles into said solution to form a shapeable polymeric composition having bubbles dispersed uniformly therein; shaping said composition into a shaped cellular article; and treating said article with a mixture of acetic anhydride and pyridine to convert the polymer in said article to polyimide.

7. A process as in claim 1 wherein said bubbles are introduced by bubbling nitrogen into said solution.

8. A process as in claim 1 wherein said bubbles are introduced by adding Dry Ice to said solution.

9. A process as in claim 1 wherein said bubbles are introduced by adding a blowing agent to said solution and agitating said solution.

10. A process as in claim 1 wherein said bubbles are introduced by mechanically frothing said solution to incorporate air bubbles.

11. A composition comprising a polyamide-acid solution having bubbles distributed through the solution.

12. A cellular article comprising a polyamide-acid article having pores distributed through the article.

13. A cellular sheet comprising a polyamide-acid of a diamine and pyromellitic dianhydride having pores distributed through the sheet.

14. A cellular sheet comprising a polyamide-acid of a dianhydride and 4,4'-diamino-diphenyl ether having pores distributed through the sheet.

15. A cellular article comprising a polyimide having pores distributed through the article.

16. A cellular sheet comprising a polyimide sheet having pores distributed through the sheet.

17. A cellular sheet comprising a polyimide of a diamine and pyromellitic dianhydride having pores distributed through the sheet.

18. A cellular sheet comprising a polyimide of a dianhydride and 4,4'-diamino-diphenyl ether having pores distributed through the sheet.

References Cited by the Examiner

UNITED STATES PATENTS

| | | | |
|---|---|---|---|
| 2,268,160 | 12/1941 | Miles | 260—2.5 |
| 3,017,391 | 1/1962 | Mottus et al. | 260—2.5 |
| 3,060,135 | 10/1962 | Becke et al. | 260—2.5 |
| 3,065,189 | 11/1962 | Becke et al. | 260—2.5 |

MURRAY TILLMAN, *Primary Examiner.*

M. FOELAK, *Assistant Examiner.*